(12) United States Patent
Palazzola

(10) Patent No.: US 7,281,601 B1
(45) Date of Patent: Oct. 16, 2007

(54) FLUID DRIVEN DIFFERENTIAL

(76) Inventor: Salvatore Palazzola, 245 Mill Rd., Staten Island, NY (US) 10306

( * ) Notice: Subject to any disclaimer, the term of this patent is extended or adjusted under 35 U.S.C. 154(b) by 325 days.

(21) Appl. No.: 11/178,947

(22) Filed: Jul. 11, 2005

(51) Int. Cl.
*B60K 17/30* (2006.01)

(52) U.S. Cl. ............... 180/305; 180/308; 180/307; 180/367; 180/6.3; 180/6.48; 180/53.4

(58) Field of Classification Search ............ 180/305, 180/308, 307, 367, 6.3, 6.48, 53.4
See application file for complete search history.

(56) References Cited

U.S. PATENT DOCUMENTS

| | | | | |
|---|---|---|---|---|
| 3,627,072 A | | 12/1971 | Smiri ..................... 180/44 |
| 3,690,398 A | * | 9/1972 | Hause ..................... 180/305 |
| 3,730,315 A | | 5/1973 | Annis et al. ............... 192/3.3 |
| 3,744,348 A | | 7/1973 | Lemon ..................... 74/869 |
| 4,181,203 A | | 1/1980 | Malloy .................... 192/3.3 |
| 4,673,055 A | | 6/1987 | Yamaoka et al. ........... 180/336 |
| 6,126,564 A | * | 10/2000 | Irikura et al. .............. 475/24 |
| 6,435,522 B1 | * | 8/2002 | Van Den Brink et al. .................. 280/5.509 |
| 6,543,560 B1 | * | 4/2003 | Trefz et al. ............... 180/53.4 |
| 6,601,663 B2 | * | 8/2003 | Hauser ..................... 180/6.3 |
| 7,083,014 B2 | * | 8/2006 | Forster ..................... 180/53.4 |

* cited by examiner

*Primary Examiner*—Paul N. Dickson
*Assistant Examiner*—Cynthia F. Collado
(74) *Attorney, Agent, or Firm*—Goldstein Law Offices, P.C.

(57) ABSTRACT

A fluid driven differential, having a fluid filled housing, an input shaft, and a pair of output shafts. The input shaft is attached to an automobile driveshaft outside of the housing and to a propeller inside the housing. The output shafts are each attached to an axle and wheel outside the housing and to a turbine inside the housing. When the driveshaft rotates the input shaft, the propeller generates a fluid current that turns the turbines and thereby turns the output shafts, the axles, and the wheels. A pair of return conduits direct fluid from the vicinity of the turbines to the vicinity of the propeller.

7 Claims, 1 Drawing Sheet

FLUID DRIVEN DIFFERENTIAL

BACKGROUND OF THE INVENTION

The invention relates to a fluid driven differential. More particularly, the invention relates to a differential that employs fluid to transfer rotary motion from a drive shaft to the wheels in an automobile drive train.

Conventional automobiles employ a differential to distribute power from a drive shaft-which often extends longitudinally in an automobile, to the wheels, each of which typically have an axis that is transverse to the drive shaft. The differential often is used to control the distribution of power to the wheels, whereby under certain conditions, one wheel will get more power than the other wheel.

The drive ratio of a standard differential is generally fixed. Accordingly, other than controlling slippage in low traction situations, the final drive ratio cannot be varied.

U.S. Pat. No. 3,627,072 to Smirl discloses a hydraulic clutch for four wheel drive vehicles, whereby a fluid pressure source is used to urge the clutch into a fully engaged condition only when the transmission is in a forward mode of operation.

U.S. Pat. No. 3,730,315 to Annis et al. discloses a hydrodynamic device with a slipping mechanical clutch. U.S. Pat. No. 3,744,348 to Lemon discloses a planetary transmission mechanism that includes a hydraulic control mechanism that is adapted to control engagement of friction engaging devices for establishing various drive rations thought the gear train. U.S. Pat. No. 4,181,203 to Malloy discloses a positive displacement hydraulic mechanism for controlling the engagement of a slipping clutch in parallel drive relationship with a torque converter. U.S. Pat. No. 4,673,055 to Yamaoka et al. discloses a transmission for self-propelled vehicles that employs a fluid-actuated clutch for interrupting input of power to the speed change mechanism before shifting operations.

While these units may be suitable for the particular purpose employed, or for general use, they would not be as suitable for the purposes of the present invention as disclosed hereafter.

SUMMARY OF THE INVENTION

It is an object of the invention to produce a differential that communicates power from an automotive driveshaft to the axles—without direct mechanical contact. Accordingly, the present invention employs fluid pressure to communicate power.

It is another object of the invention to provide a differential that allows nearly infinite "drive ratios" to be achieved. Accordingly, power is transmitted from propeller to fluid to turbine—allowing nearly infinite combinations of power and speed to be achieved immediately. Such combinations are tailored directly to the loading conditions on the wheels.

It is a further object of the invention to provide superior gas mileage. Accordingly, by directly meeting speed and torque requirements, a more efficient transfer of power is obtained.

The invention is a fluid driven differential, having a fluid filled housing, an input shaft, and a pair of output shafts. The input shaft is attached to an automobile driveshaft outside of the housing and to a propeller inside the housing. The output shafts are each attached to an axle and wheel outside the housing and to a turbine inside the housing. When the driveshaft rotates the input shaft, the propeller generates a fluid current that turns the turbines and thereby turns the output shafts, the axles, and the wheels. A pair of return conduits direct fluid from the vicinity of the turbines to the vicinity of the propeller.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
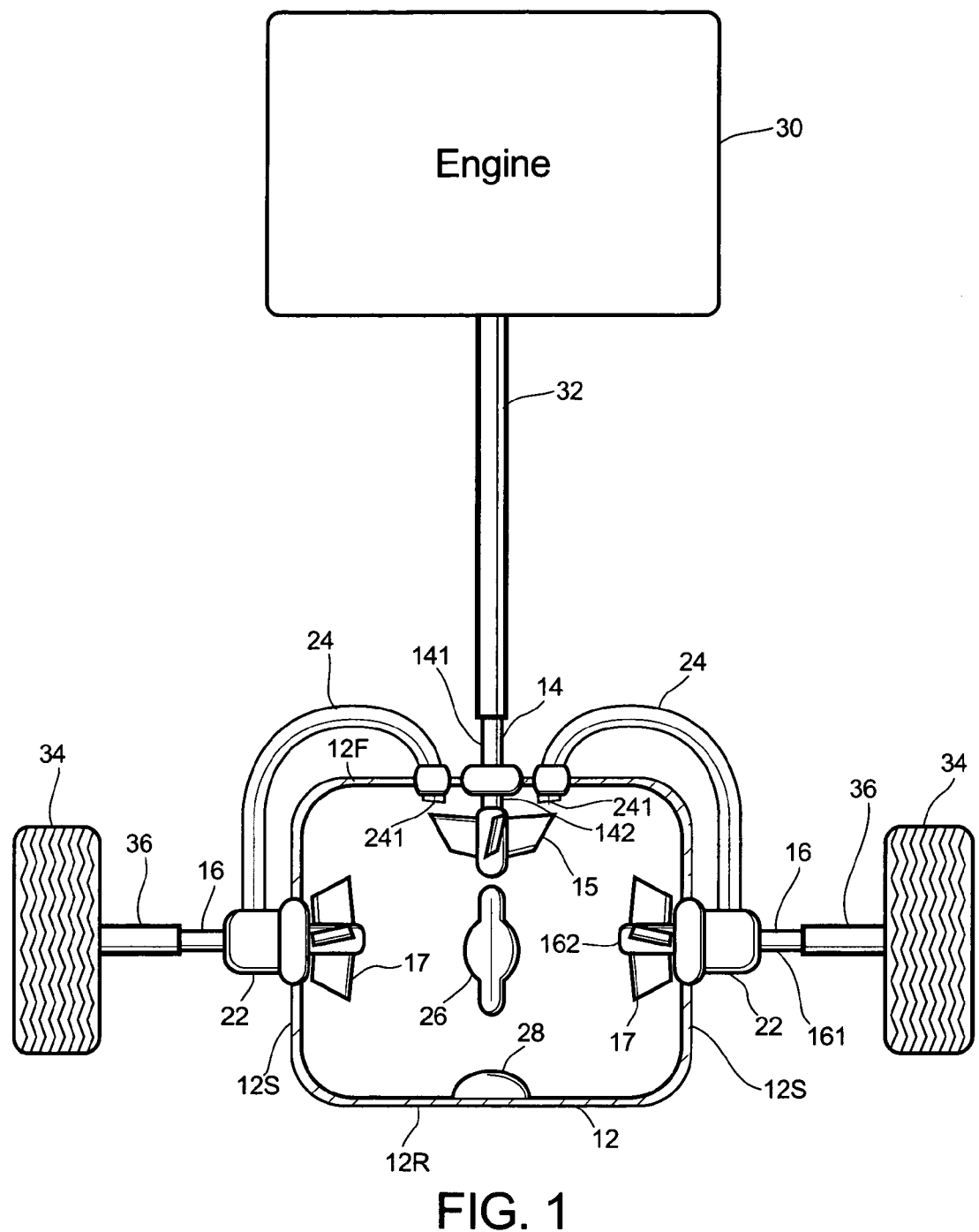
FIG. 1 is a diagrammatic, top plan view, with parts broken away, illustrating the components of the present invention interconnected with an engine and wheels of an automobile.

FIG. 1 illustrates a differential 10. The differential has a housing 12, an input shaft 14, and a pair of output shafts 16 that extend perpendicularly to the input shaft 14 and substantially coaxially with each other, although in opposite directions.

The housing 12 has a front wall 12F, a rear wall 12R, and a pair of side walls 12S. The housing 12 is substantially sealed, defines an interior volume, and thereby is capable of containing a quantity of automatic transmission fluid. The automatic transmission fluid substantially fills the interior volume, so that the housing 12 is pressurized.

The input shaft 14 extends through the front wall 12F of the housing 12 and has an outer portion 141 outside the housing 12 and an inner portion 142 within the housing. A propeller 15 is mounted on the input shaft 14 at the inner portion 142. Note that the input shaft 14 extends through the front wall 12F of the housing through a input shaft seal 20 that prevents fluid from leaking through the front wall 12F of the housing.

The output shafts 16 each extend through one of the housing side walls 12S. Each output shaft 16 has an outer portion 161 outside of the housing 12 and an inner portion 162 inside the housing 12. In addition a fluid manifold 22 is mounted concentrically around each output shaft 16 and communicates with the interior. In particular, each fluid manifold 22 has an opening around its associated output shaft 16 that allows fluid to extend through the side wall 12S thereinto. A turbine 17 is mounted upon each output shaft 16 at its inner portion 162 such that when the turbine 17 rotates, the output shaft 16 rotates therewith.

A pair of return conduits 24 extend from the fluid manifolds 22 to the front wall 12F of the housing. In particular, each return conduit 24 is in communication with one of the one of the fluid manifolds 22, and has an output port 241 located adjacent to the input shaft 14. In particular, the two output ports 241 are located on opposite sides of the input shaft 14, both at the same radial distance from the input shaft 14, and behind the propeller 15.

When mounted in an automobile having an engine 30 and an associated driveshaft 32, the driveshaft 32 is attached to the outer portion 141 of the input shaft 14 such that the driveshaft 32 is substantially coaxial with the input shaft 14. In addition, the automobile has wheels 34 which are mounted upon axles 36. The axles 36 are each secured to one of the output shafts 16 at its outer portion 161.

When the automobile engine 30 rotates the driveshaft 32, and thus the input shaft 14, the propeller 15 is caused to rotate. The rotating propeller 15 causes a surge in the fluid within the housing 12, which in turn causes the turbines 17 to rotate. The turbines 17 rotate the output shafts 16 and thereby cause the axles 36 and wheels 34 to rotate. Thus summarizes the general theory of operation for the present invention.

In order to prevent unusual and counterproductive currents within the housing 12, the return conduits 24 duct fluid from immediately behind the turbines 17 to immediately in front of the propeller 15. Accordingly, as the propeller 15 rotates and urges a current of fluid rearwardly within the housing 12, a vacuum is created behind the propeller 15. This vacuum helps draw fluid from behind turbines 17, and generally directs the current of fluid within the housing 12 toward the turbines 17.

The actual shape of the housing 12 can be varied significantly, as empirical experimentation helps to determine the most efficient shapes for directing fluid currents from the propeller 15 to turbines 17. In this regard, the housing 12 is illustrated as containing a longitudinal divider 26, which may help split the current of fluid toward each of the turbines 17. In addition, a convex deflector 28 is preferably employed at the rear wall 12R, substantially coaxial with the propeller 15 to help deflect fluid currents reaching the rear wall 12R toward the turbines 17.

In conclusion, herein is presented a fluid driven differential that employs fluid pressure generated by a driveshaft driven propeller to drive turbine driven wheels and axles. The invention is illustrated by example in the drawing figures, and throughout the written description. It should be understood that numerous variations are possible, while adhering to the inventive concept. Such variations are contemplated as being a part of the present invention.

What is claimed is:

1. An automobile differential system, comprising:
   an engine having a driveshaft;
   a pair of wheels, each wheel attached on an axle;
   a housing having a front wall, a rear wall, and side walls, the housing having an interior cavity containing fluid;
   an input shaft extending through the front wall and attached to the drive shaft;
   a pair of output shafts, each output shaft extending through one of the side walls and attached to one of the axles;
   a propeller mounted only on the input shaft, within the housing, for causing a fluid current within the housing when the input shaft is rotated by the driveshaft; and
   a pair of turbines, each turbine mounted on one of the output shafts, for being rotated by the fluid current and thereby rotating the output shafts, axles, and wheels thereby.

2. The automobile differential system as recited in claim 1, further comprising a pair of return conduits for communicating fluid from near the turbines to the front wall, near the propeller.

3. The automobile differential system as recited in claim 2, wherein each return conduit has an output port on the front wall, the output ports are both located the same radial distance from the input shaft.

4. The automobile differential system as recited in claim 3, further comprising a fluid manifold associated with each output shaft, mounted to the side wall adjacent to said output shaft such that the output shaft extends therethrough, the fluid manifold catching fluid from behind the turbines and communicating said fluid to the return conduits.

5. The automobile differential system as recited in claim 3, wherein the housing has a longitudinal deflector for splitting the fluid current toward the turbines.

6. The automobile differential system as recited in claim 5, further comprising a convex deflector mounted to the rear wall, substantially coaxial with the propeller.

7. The automobile differential system as recited in claim 6, wherein the output shafts are coaxial, and perpendicular to the input shaft.

* * * * *